United States Patent
Gubbi Lakshminarasimha et al.

(10) Patent No.: US 12,094,035 B2
(45) Date of Patent: Sep. 17, 2024

(54) METHODS AND SYSTEMS FOR LOCALIZED SMOKE REMOVAL AND COLOR RESTORATION OF REAL-TIME VIDEO

(71) Applicant: Tata Consultancy Services Limited, Mumbai (IN)

(72) Inventors: Jayavardhana Rama Gubbi Lakshminarasimha, Bangalore (IN); Karthik Seemakurthy, Bangalore (IN); Vartika Sengar, Bangalore (IN); Aparna Kanakatte Gurumurthy, Bangalore (IN); Avik Ghose, Kolkata (IN); Balamuralidhar Purushothaman, Bangalore (IN); Murali Poduval, Mumbai (IN); Jayeeta Saha, Mumbai (IN); Srinivasan Jayaraman, Lake Oswego, OR (US); Vivek Bangalore Sampathkumar, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 380 days.

(21) Appl. No.: 17/645,116

(22) Filed: Dec. 20, 2021

(65) Prior Publication Data
US 2022/0366618 A1    Nov. 17, 2022

(30) Foreign Application Priority Data
Apr. 9, 2021   (IN) .............................. 202121016802

(51) Int. Cl.
*G06T 11/00* (2006.01)
*G06T 7/90* (2017.01)
*G06V 10/56* (2022.01)

(52) U.S. Cl.
CPC .............. *G06T 11/001* (2013.01); *G06T 7/90* (2017.01); *G06V 10/56* (2022.01); *G06T 2207/10016* (2013.01)

(58) Field of Classification Search
CPC .................... G06T 11/001; G06T 7/90; G06T 2207/10016; G06T 5/00; G06T 2207/10068; G06V 10/56
See application file for complete search history.

(56) References Cited

U.S. PATENT DOCUMENTS

| | | | |
|---|---|---|---|
| 9,305,339 B2 | 4/2016 | Yang et al. | |
| 2016/0005152 A1* | 1/2016 | Yang ........................ | G06T 5/73 382/275 |

(Continued)

OTHER PUBLICATIONS

Bolun Cai et al., "DehazeNet: An End-to-End System for Single Image Haze Removal", IEEE Transactions on Image Processing, Jan. 2016, vol. 25 (11), IEEE, https://arxiv.org/pdf/1601.07661.pdf.

*Primary Examiner* — Chan S Park
*Assistant Examiner* — Daniel C Chang
(74) *Attorney, Agent, or Firm* — FINNEGAN, HENDERSON, FARABOW, GARRETT & DUNNER LLP

(57) ABSTRACT

The disclosure herein relates to methods and systems for localized smoke removal and color restoration of a real-time video. Conventional techniques apply the de-smoking process only on a single image, by finding the regions having the smoke, based on manual air-light estimation. In addition, regaining original colors of de-smoked image is quite challenging. The present disclosure herein solves the technical problems. In the first stage, video frames having the smoky and smoke-free video frames are identified, from the video received in the real-time. In the second stage, an air-light is estimated automatically using a combined feature map. An intermediate de-smoked video frame for each smoky video (Continued)

frame is generated based on the air-light using a de-smoking algorithm. In the third and the last stage, a smoke-free video reference frame is used to compensate for color distortions introduced by the de-smoking algorithm in the second stage.

13 Claims, 9 Drawing Sheets

(56) References Cited

U.S. PATENT DOCUMENTS

2019/0182421 A1* 6/2019 Piponi .................. A61B 1/0005
2021/0142487 A1* 5/2021 Xu ............................ G06T 7/70

* cited by examiner

METHODS AND SYSTEMS FOR LOCALIZED SMOKE REMOVAL AND COLOR RESTORATION OF REAL-TIME VIDEO

PRIORITY CLAIM

This U.S. patent application claims priority under 35 U.S.C. § 119 to: Indian Patent Application No. 202121016802, filed on 9 Apr. 2021. The entire contents of the aforementioned application are incorporated herein by reference.

TECHNICAL FIELD

The disclosure herein generally relates to the field of image and video processing, and, more particularly, to methods and systems for localized smoke removal and color restoration of a real-time video.

BACKGROUND

Removing a scattering media such as smoke (also referred as a 'plume') present in videos is very important in many applications including time critical minimally invasive surgeries such as laparoscopic surgeries, arthroscopic surgeries, and robotic surgeries, deep sea autonomous vehicle navigation, automated welding, firefighting devices, and so on. For example, during the time critical minimally invasive surgeries, surgeons use specialized scopes and cameras with external light sources to visualize internal organs of a living being in real-time on a display device such as a monitor. Visualization of a surgeon is dependent on a field of vision of the camera and an environment in which the light source illuminates the field, during the surgery. Use of energy instruments such as diathermy and harmonic scalpels for cauterization of vessels and dissection of tissue while performing the surgery, creates a smoke, which may obscure the field of vision. The created smoke may be partially cleared by use of a suction, but an effect of the suction may not be fast or effective enough to enable continuation of the surgery without interruption. An ability to filter and clean the smoke in the coming video using computer vision may help in better visualization and thus saving valuable surgical time spent in clearing the field in real-time.

Detection of the smoke in the real-time videos for example, in minimally invasive surgery scenarios, using image-based methods is very challenging due to non-uniform nature of the smoke. Further, the concentration of the smoke may vary non-uniformly across the video scene resulting in transparent to opaque regions in the video. Another major challenge is a non-uniform illumination pattern induced by a near-field light source used to illuminate the video scene. Conventional techniques adopt the principles used in dehazing for removing the smoke in the video, due to the similarity in some of properties of the smoke and haze. However, in addition to the challenges imposed by the non-uniform nature of the smoke and the light source, most of conventional dehazing algorithms induce color distortions in the video while de-smoking (process for removing the smoke), results in degrading the quality of the video. In the minimally invasive surgery scenarios, the degradation in the quality of the video may mislead the surgeons, results in a life risk to the living being.

Further, the conventional techniques apply the de-smoking process only on a single image, by finding the regions having the smoke, based on manual air-light estimation. However, regaining original colors of de-smoked image (after smoke removal) is quite challenging. The color distortions may also affect the quality and an accuracy of the de-smoked image, where the artifacts can be misconstrued to be an anomaly in the affected regions.

SUMMARY

Embodiments of the present disclosure present technological improvements as solutions to one or more of the above-mentioned technical problems recognized by the inventors in conventional systems.

In an aspect, there is provided a processor-implemented method for localized smoke removal and color restoration of a real-time video, the method comprising the steps of: receiving the real-time video, wherein the real-time video comprises a plurality of video frames; identifying one or more smoky video frames and one or more smoke-free video frames, for the real-time video, from the plurality of video frames, using a smoke video frame identification model, wherein each smoky video frame of the one or more smoky video frames comprises one or more precise smoke regions; generating a smoky feature map for each smoky video frame of the one or more smoky video frames, using smoke relevant features of the corresponding smoky video frame, wherein the smoky feature map for each smoky video frame comprises features of the one or more precise smoky regions; automatically estimating an air-light for each smoky video frame of the one or more smoky video frames, using the corresponding smoky feature map; generating an intermediate de-smoked video frame for each smoky video frame of the one or more smoky video frames, based on the corresponding estimated air-light, using a de-smoking algorithm; identifying a smoke-free reference video frame for each smoky video frame of the one or more smoky video frames, out of the one or more smoke-free video frames, wherein the smoke-free reference video frame for each smoky video frame is a smoke-free video frame out of the one or more smoke-free video frames, present just before the corresponding smoky video frame; generating a de-smoked video frame for each smoky video frame of the one or more smoky video frames, by compensating color information obtained from the corresponding smoke-free reference video frame, locally in the one or more precise smoke regions of the corresponding intermediate de-smoked video frame; and stitching the de-smoked video frame for each smoky video frame of the one or more smoky video frames, to obtain a de-smoked video in the real-time.

In another aspect, there is provided a system for localized smoke removal and color restoration of a real-time video, the system comprising: a memory storing instructions; one or more Input/Output (I/O) interfaces; and one or more hardware processors coupled to the memory via the one or more I/O interfaces, wherein the one or more hardware processors are configured by the instructions to: receive the real-time video, wherein the real-time video comprises a plurality of video frames; identify one or more smoky video frames and one or more smoke-free video frames, for the real-time video, from the plurality of video frames, using a smoke video frame identification model, wherein each smoky video frame of the one or more smoky video frames comprises one or more precise smoke regions; generate a smoky feature map for each smoky video frame of the one or more smoky video frames, using smoke relevant features of the corresponding smoky video frame, wherein the smoky feature map for each smoky video frame comprises features of the one or more precise smoky regions; automatically estimate an air-light for each smoky video frame of the one or more smoky video frames, using the corresponding smoky feature map; generate an intermediate de-smoked video frame for each smoky video frame of the one or more smoky video frames, based on the corresponding estimated air-light, using a de-smoking algorithm; identify a smoke-free reference video frame for each smoky video frame of the one or more smoky video frames, out of the one or more smoke-free video frames, wherein the smoke-free reference video frame for each smoky video frame is a smoke-free video frame out of the one or more smoke-free video frames, present just before the corresponding smoky video frame; generate a de-smoked video frame for each smoky video frame of the one or more smoky video frames, by compensating color information obtained from the corresponding smoke-free reference video frame, locally in the one or more precise smoke regions of the corresponding intermediate de-smoked video frame; and stitch the de-smoked video frame for each smoky video frame of the one or more smoky video frames, to obtain a de-smoked video in the real-time.

In yet another aspect, there is provided a computer program product comprising a non-transitory computer readable medium having a computer readable program embodied therein, wherein the computer readable program, when executed on a computing device, causes the computing device to: receive the real-time video, wherein the real-time video comprises a plurality of video frames; identify one or more smoky video frames and one or more smoke-free video frames, for the real-time video, from the plurality of video frames, using a smoke video frame identification model, wherein each smoky video frame of the one or more smoky video frames comprises one or more precise smoke regions; generate a smoky feature map for each smoky video frame of the one or more smoky video frames, using smoke relevant features of the corresponding smoky video frame, wherein the smoky feature map for each smoky video frame comprises features of the one or more precise smoky regions; automatically estimate an air-light for each smoky video frame of the one or more smoky video frames, using the corresponding smoky feature map; generate an intermediate de-smoked video frame for each smoky video frame of the one or more smoky video frames, based on the corresponding estimated air-light, using a de-smoking algorithm; identify a smoke-free reference video frame for each smoky video frame of the one or more smoky video frames, out of the one or more smoke-free video frames, wherein the smoke-free reference video frame for each smoky video frame is a smoke-free video frame out of the one or more smoke-free video frames, present just before the corresponding smoky video frame; generate a de-smoked video frame for each smoky video frame of the one or more smoky video frames, by compensating color information obtained from the corresponding smoke-free reference video frame, locally in the one or more precise smoke regions of the corresponding intermediate de-smoked video frame; and stitch the de-smoked video frame for each smoky video frame of the one or more smoky video frames, to obtain a de-smoked video in the real-time.

In an embodiment, the de-smoked video is displayed in the real-time, on a display unit.

In an embodiment, the smoke relevant features comprise (i) dark channel features, (ii) contrast features, (iii) hue disparity features, and (iv) local maximum saturation features.

In an embodiment, the smoky feature map for each smoky video frame of the one or more smoky video frames, using the smoke relevant features for the corresponding smoky video frame, is generated by: determining a dark channel feature map for each smoky video frame, based on minimum pixel color values of a local patch present in the corresponding smoky video frame, wherein the dark channel feature map for each smoky video frame comprises dark channel features; determining a contrast feature map for each smoky video frame, based on a variance of pixel intensities obtained from the local patch, compared to a center pixel of the corresponding smoky video frame, wherein the contrast feature map for each smoky video frame comprises contrast features; determining a hue disparity feature map for each smoky video frame, based on hue disparity between the corresponding smoky video frame and a corresponding semi-inverse smoky video frame, wherein the hue disparity feature map for each smoky video frame comprises hue disparity features; determining a local maximum saturation feature map for each smoky video frame, based on maximum pixel-wise saturation values of the local patch present in the corresponding smoky video frame, wherein the local maximum saturation feature map for each smoky video frame comprises local maximum saturation features; and generating the smoky feature map for each smoky video frame, by combining the corresponding dark channel feature map, the corresponding contrast feature map, the corresponding hue disparity feature map, and the corresponding local maximum saturation feature map.

In an embodiment, the intermediate de-smoked video frame for each smoky video frame is generated by locally removing the one or more precise smoky regions present in the corresponding smoky video frame, based on the corresponding estimated air-light, using the de-smoking algorithm.

It is to be understood that both the foregoing general description and the following detailed description are exemplary and explanatory only and are not restrictive of the embodiments of the present disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
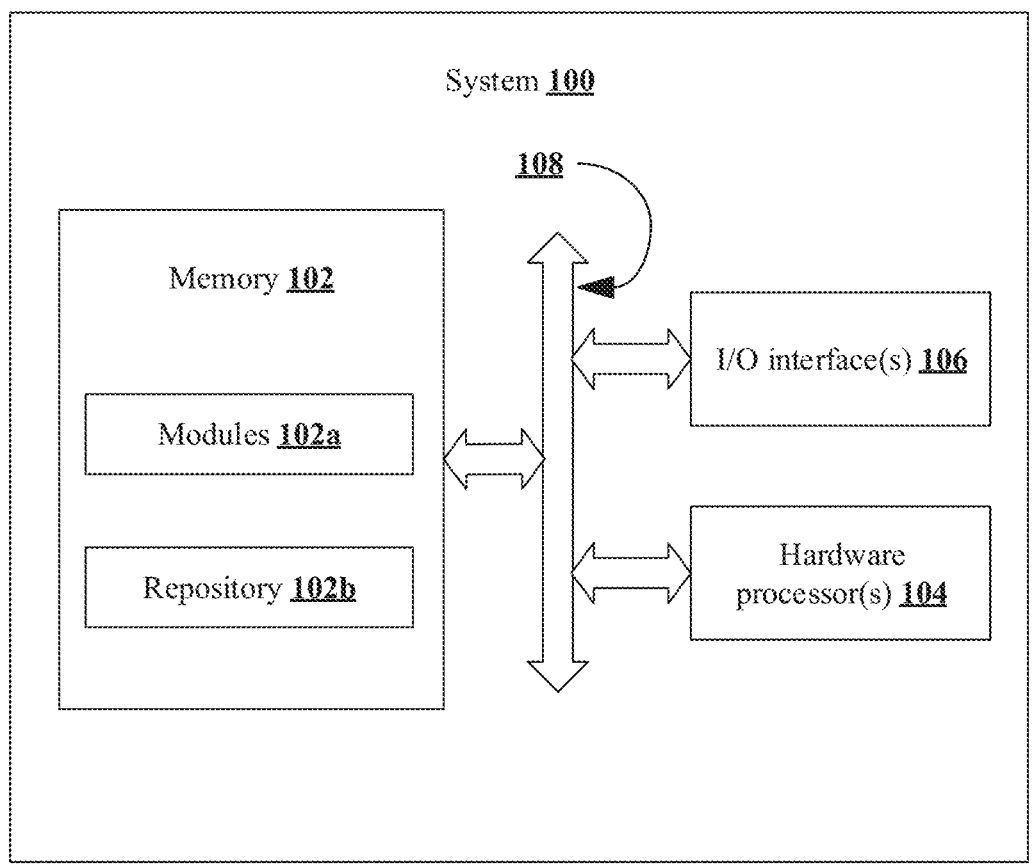
FIG. 1 is an exemplary block diagram of a system for localized smoke removal and color restoration of a real-time video, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The present disclosure herein provides methods and systems for localized smoke removal and color restoration of a real-time video to solve the technical problems for removing a smoke (also referred as a 'plume') present in a video receiving in real-time. In the first stage, video frames having the smoke (termed as 'smoky video frames' here after) and non-smoky video frames (termed as 'smoke-free video frames' here after), from the video received in the real time. In the second stage, an air-light is estimated automatically using a combined feature map obtained from smoke relevant features of each smoky video frame. An intermediate de-smoked video frame (after smoke removal) for each smoky video frame is generated based on the air-light using a de-smoking algorithm. In the third and last stage, a smoke-free video reference frame is identified for each smoky video frame for color reconstruction to compensate for color distortions introduced by the de-smoking algorithm in the second stage.

Referring now to the drawings, and more particularly to FIG. 1 through FIG. 5D, where similar reference characters denote corresponding features consistently throughout the figures, there are shown preferred embodiments and these embodiments are described in the context of the following exemplary systems and/or methods.

FIG. 1 is an exemplary block diagram of a system 100 for localized smoke removal and color restoration of a real-time video, in accordance with some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102a and a repository 102b for storing data processed, received, and generated by one or more of the plurality of modules 102a. The plurality of modules 102a may include routines, programs, objects, components, data structures, and so on, which perform particular tasks or implement particular abstract data types.

The plurality of modules 102a may include programs or computer-readable instructions or coded instructions that supplement applications or functions performed by the system 100. The plurality of modules 102a may also be used as, signal processor(s), state machine(s), logic circuitries, and/or any other device or component that manipulates signals based on operational instructions. Further, the plurality of modules 102a can be used by hardware, by computer-readable instructions executed by the one or more hardware processors 104, or by a combination thereof. In an embodiment, the plurality of modules 102a can include various sub-modules (not shown in FIG. 1). Further, the memory 102 may include information pertaining to input(s)/output(s) of each step performed by the processor(s) 104 of the system 100 and methods of the present disclosure.

The repository 102b may include a database or a data engine. Further, the repository 102b amongst other things, may serve as a database or includes a plurality of databases for storing the data that is processed, received, or generated as a result of the execution of the plurality of modules 102a. Although the repository 102a is shown internal to the system 100, it will be noted that, in alternate embodiments, the repository 102b can also be implemented external to the system 100, where the repository 102b may be stored within an external database (not shown in FIG. 1) communicatively coupled to the system 100. The data contained within such external database may be periodically updated. For example, new data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102b may be distributed between the system 100 and the external database.

Figure 2:
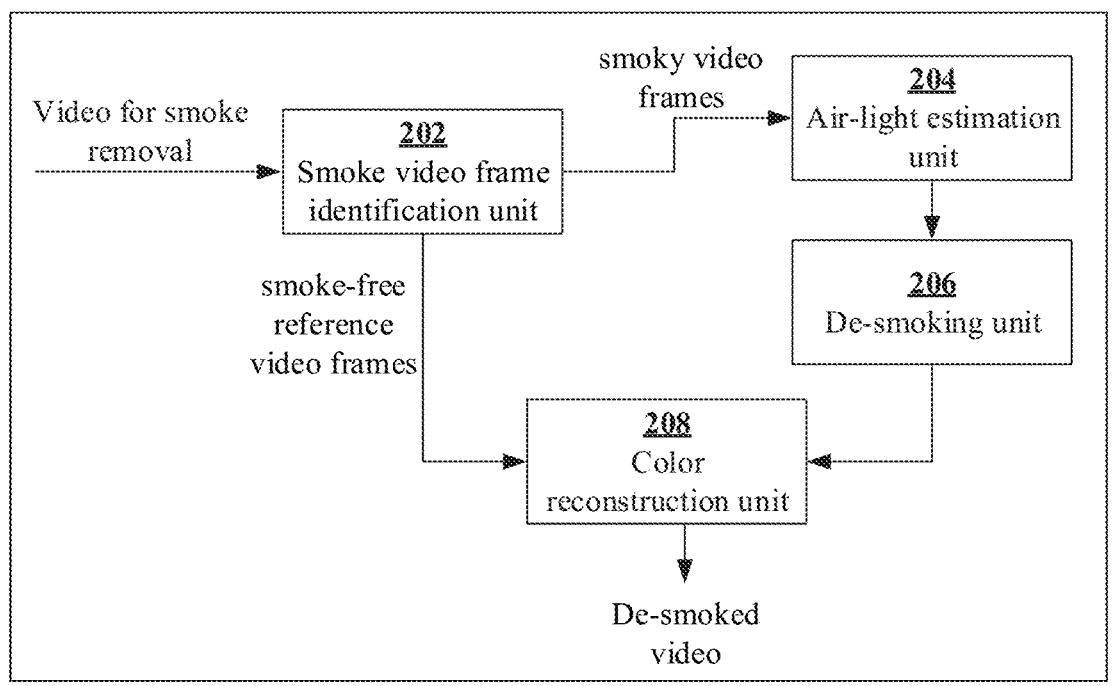
FIG. 2 is an exemplary block diagram illustrating modules of the system of FIG. 1 for localized smoke removal and color restoration of the real-time video, in accordance with some embodiments of the present disclosure.
Figure 3A:
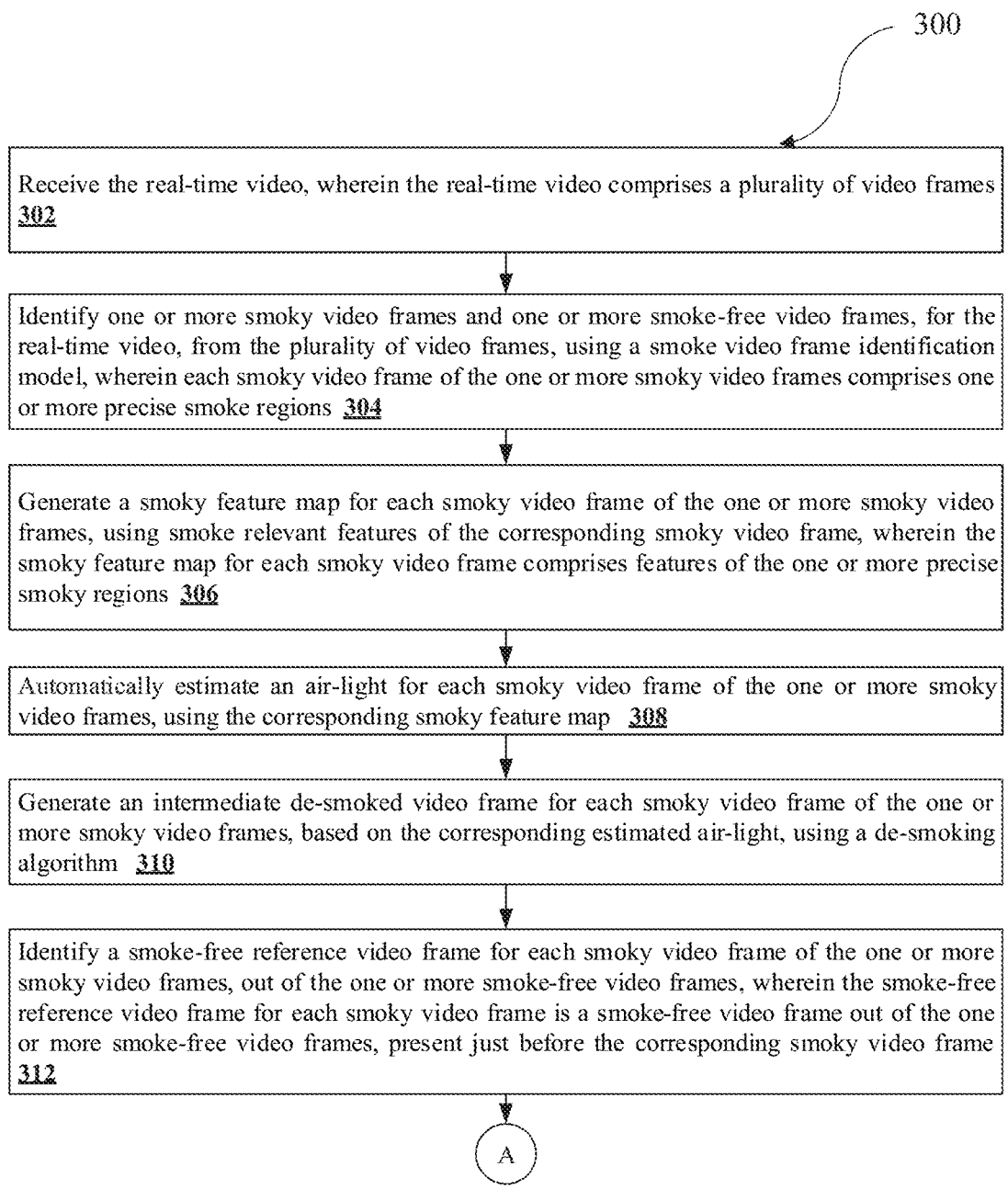
FIG. 3A illustrates a first exemplary flow diagram of a processor-implemented method for localized smoke removal and color restoration of the real-time video, in accordance with some embodiments of the present disclosure.
Figure 3B:
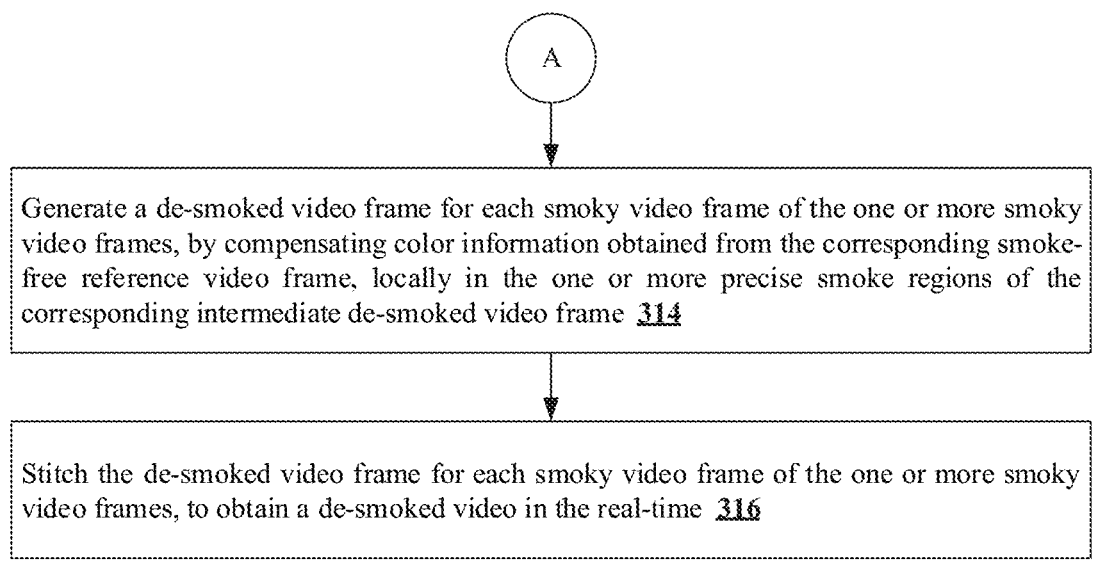
FIG. 3B illustrates a second exemplary flow diagram of a processor-implemented method for localized smoke removal and color restoration of the real-time video, in accordance with some embodiments of the present disclosure.

Referring collectively to FIG. 2 and FIG. 3A and FIG. 3B, components and functionalities of the system 100 are described in accordance with an example embodiment of the present disclosure. For example, FIG. 2 is an exemplary block diagram illustrating modules of the system 100 of FIG. 1 for localized smoke removal and color restoration of the real-time video, in accordance with some embodiments of the present disclosure. As shown in FIG. 2, the modules include a smoke video frame identification unit 202, an air-light estimation unit 204, a de-smoking unit 206, and a color reconstruction unit 208. In an embodiment, the modules of FIG. 2 may be stored in the plurality of modules 102a comprised in the memory 102 of the system 100.

FIG. 3A and FIG. 3B illustrates an exemplary flow diagram of a processor-implemented method 300 for localized smoke removal and color restoration of the real-time video, in accordance with some embodiments of the present disclosure. Although steps of the method 300 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 302 of the method 300, the one or more hardware processors 104 of the system 100 are configured to receive the real-time video from which the smoke to be removed. The real-time video is the video which receives in the real-time during performing a task based on an application. The real-time video includes a plurality of video frames, where the plurality of video frames may be received continuously in the real-time, in a sequential order. Each video frame of the plurality of video frames may be identified by a unique frame index. For example, the first video frame may have the frame index '1', the second video frame may have the frame index '2', and so on. A video acquisition unit (not shown in FIG. 1) may be used to acquire the video in the real-time.

For example, in case of the minimally invasive surgeries, the video may be received as soon as the surgeon starts the surgery of a living being in the real-time and the video may be stopped receiving once the surgery is completed. Additionally, external light sources may be used to visualize internal organs of the living being during the surgery. In this case, specialized scopes or cameras may be used as the video acquisition unit to acquire the video in the real-time and the video may be displayed simultaneously on a display unit (not shown in FIG. 1) such as a monitor. In an embodiment, the video acquisition unit and the display unit may be present within the system 100, or externally connected to the system 100 through the I/O interface(s) 106. In the context of the present disclosure the living being may include any living subject such as a human, an animal, and so on.

At step 304 of the method 300, the one or more hardware processors 104 of the system 100 are configured to identify one or more smoky video frames and one or more smoke-free video frames, from the plurality of video frames of the real-time video received at step 302 of the method 300. A smoke video frame identification model is used to identify the video frames having the smoke along with the smoky regions in the video frame, and the video frames not having the smoke. So, each smoky video frame of the one or more smoky video frames includes one or more precise smoke regions. In an embodiment, the unique frame index may be used to refer which video frames are the smoky video frames and which video frames are the smoke-free video frames.

In an embodiment, the smoke video frame identification model is an artificial intelligence (AI) based model and is obtained by training a convolutional neural network with encoder-decoder architecture (For example, U-Net), with a predefined number of smoky frames and smoke-free frames, followed by testing to check an accuracy of the model after the training. The convolutional neural network with encoder-decoder architecture captures context and enables precise segmentation (localization) of the smoke regions in the video frames. The convolutional neural network with encoder-decoder architecture can be trained with lesser number of smoky video frames and smoke-free video frames. The smoke video frame identification model may be present in the smoke video frame identification unit 202 of FIG. 2. The unique frame index of each smoky video frame of the one or more smoky video frames, and each smoke-free video frame of the one or more smoke-free video frames, are stored in the repository 102b of the system 100 for subsequent use.

An image formation model for the image $I^c(x)$ having the smoke at the pixel location (x) is mathematically represented as in equation 1:

$$I^c(x)=J^c(x)t(x)+(1-t(x))A^c \qquad (1)$$

wherein $J^c(x)$ represents an actual radiance of the scene, $t(x)$ represents a transmission of the scene, $A^c$ represents an air-light component, and $c \in \{r, g, b\}$ represents color channel indicator. From equation 1, for every single value of smoky observation on the left-hand side, three unknown variables on the right side. This makes the estimation of actual radiance $J^c(x)$ an ill-posed problem. Further, conventional techniques used a manual and fixed air-light which makes to only few images where air-light are available in priori. The time critical applications such as invasive surgeries cannot afford manual and fixed air-light.

At step 306 of the method 300, the one or more hardware processors 104 of the system 100 are configured to generate a smoky feature map for each smoky video frame of the one or more smoky video frames, using smoke relevant features of the corresponding smoky video frame. The smoky feature map for each smoky video frame comprises features of the one or more precise smoky regions. In an embodiment, the smoke relevant features may be haze relevant features including (i) dark channel features, (ii) contrast features, (iii) hue disparity features, and (iv) local maximum saturation features. The dark channel features, the contrast features, the hue disparity features, and the local maximum saturation features are used as cues to identify the presence of the smoke at a certain location in the corresponding smoky video frame.

The smoky feature map for each smoky video frame is generated by combining the dark channel features, the contrast features, the hue disparity features, and the local maximum saturation features, in the form of feature maps. A dark channel feature map for each smoky video frame, is determined based on minimum pixel color values of a local patch present in the corresponding smoky video frame. The local patch is a portion of the smoky video frame having a predefined patch size, for example, 3×3 pixels. The dark channel map indicates higher intensities in regions having the smoke while the regions without the smoke have zero intensities.

More specifically, at least a pixel location may exist in each smoky video frame, where one of three color channels (r, g, b) intensity approaches zero. Dark channel map is determined by finding a minimum intensity across all color channels within the patch of the patch size p×p defined at pixel location x. Ideally, if there is no smoke (smoke-free video frame), then the dark channel map will have zeros at most of the pixel locations. The dark channel map ($I_{dark}^p(x)$) for the smoky video frame ($I^c(x)$) is mathematically expressed as in equation 2:

$$I_{dark}^p(x) = \min_{c \in \{r,g,b\}} \min_{y \in \Omega_p(x)} I^c(y) \qquad (2)$$

wherein x represents a pixel location having the smoke and p denotes the patch size.

A contrast feature map for each smoky video frame is determined based on a variance of pixel intensities obtained from the local patch, compared to a center pixel of the corresponding smoky video frame. The presence of smoke obscures the objects in the scene by reducing the contrast. The contrast measure gives an indication of the intensity of smoke.

More specifically, the contrast is a difference in a luminance or the color that makes an object (or a representation in an image or display) distinguishable. In visual perception of a real world, contrast is determined by the difference in the color and brightness of the object and other objects within the same field of view. A local contrast measure may be used as an indicative measure of how distinctively a certain pixel may be identified from surrounding pixels. Mathematically, the local contrast measure is measured as a variance of pixel intensities within the local patch of patch size s×s defined at a pixel location y. The presence of smoke obscures the scene which makes a certain pixel location losing distinctiveness from the surrounding pixels and thus reducing the contrast measure. Hence, lower values of local contrast may be an indicative measure of the presence of smoke. Rather than a simple local contrast measure, a maximum of contrast values within a patch of p×p defined at a location x in the local contrast map may be considered as a better measure for the presence of smoke for majority of the images. The dark channel map ($I_{ct}^p(x)$) for the smoky video frame ($I^c(x)$) within the local patch of size p×p is mathematically expressed as in equation 3:

$$I_{ct}^p(x) = \max_{y \in \Omega_p(x)} \sqrt{\frac{1}{3|\Omega_s(y)|} \sum_{k \in \Omega_s(y)} \|I(z) - I(y)\|^2} \qquad (3)$$

wherein x represents the pixel location having the smoke.

A hue disparity feature map for each smoky video frame is determined based on hue disparity between the corresponding smoky video frame and a corresponding semi-inverse smoky video frame. The semi-inverse smoky video frame is a maximum of the actual smoky video frame and an inverse of the actual smoky video frame.

More specifically, the hue is an indicative measure of a color, and is measured in degrees in a range [0, 360]. The semi-inverse smoky video frame inverts the darker pixels to bright without making changes to already existing brighter pixels. The presence of the smoke also transforms the pixel intensities to brighter side. This implies that the nature of colors in the semi-inverse smoky video frame is closer to the colors induced in the smoky regions of the actual smoky video frame. Hence, the difference of hue between the actual smoky video frame and the semi-inverse smoky video frame image is significantly higher in smoke-free regions while the difference of the hue being lower in smoky regions. The hue disparity feature map ($I_{hd}$) for the smoky video frame is mathematically expressed as in equation 4:

$$I_{hd} = |I_{st}^h - I^h| \qquad (4)$$

where $I_{st}^h$ represents a hue component of the semi-inverse smoky video frame image and $I^h$ represents the hue component of the actual smoky video frame.

A local maximum saturation feature map for each smoky video frame, is determined based on maximum pixel-wise saturation values of the local patch present in the corresponding smoky video frame. Similar to the contrast, local saturation is also used as an indicative cue to identify the smoke.

More specifically the saturation defines a purity of the color, the higher the saturation, the purer the color is. Presence of the smoke desaturates all the colors. Hence, the saturation may be considered as a measure of the smoke intensity. Though the saturation by itself may be considered as the indicative measure for smoke, similar to the local maximum contrast, the local maximum saturation is considered to be a better indicative measure for the smoke. The local maximum saturation feature map ($I_{st}(x)$) within the local patch of the patch size of p×p, for the smoky video frame ($I^c(x)$) is mathematically expressed as in equation 5:

$$I_{st}(x) = \max_{y \in \Omega_p(x)} \left( 1 - \frac{\min_{c \in \{r,g,b\}} I^c(y)}{\max_{c \in \{r,g,b\}} I^c(y)} \right) \qquad (5)$$

The smoky feature map for each smoky video frame, by combining the corresponding dark channel feature map, the corresponding contrast feature map, the corresponding hue disparity feature map, and the corresponding local maximum saturation feature map. The smoky feature map ($C_{map}$) for each smoky video frame is mathematically expressed as in equation 6:

$$C_{map}=I_{dark}^p \odot (1-I_{ct}^p) \odot (1-I_{hd}) \odot (1-I_{st}) \quad (6)$$

wherein p represents a patch size of a local patch within the corresponding smoky video frame, $\odot$ represents element-wise multiplication, $I_{dark}^p$ represents a dark channel feature map of the corresponding smoky video frame, $I_{ct}^p$ represents a contrast feature map of the corresponding smoky video frame, $I_{hd}$ represents a hue disparity feature map of the corresponding smoky video frame, and $I_{st}$ represents a local maximum saturation feature map of the corresponding smoky video frame.

Figure 4A:
FIG. 4A shows an exemplary smoky video frame showing a dark channel feature map of the exemplary smoky video frame, in accordance with some embodiments of the present disclosure.
Figure 4B:
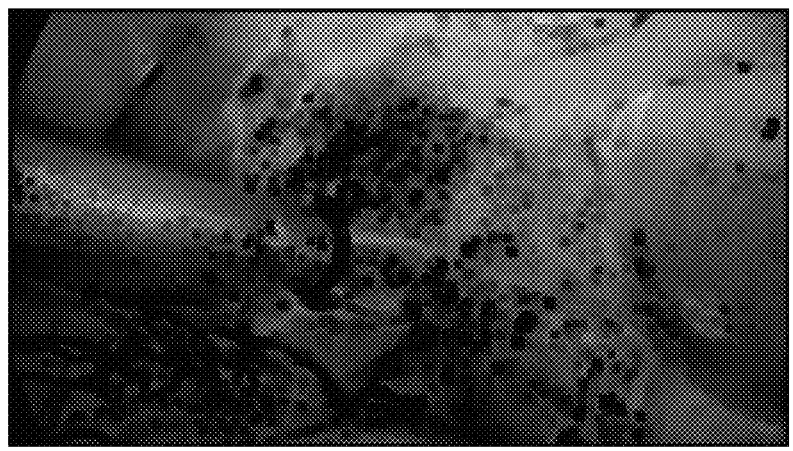
FIG. 4B shows an exemplary smoky video frame showing a hue disparity feature map of the exemplary smoky video frame, in accordance with some embodiments of the present disclosure.
Figure 4C:
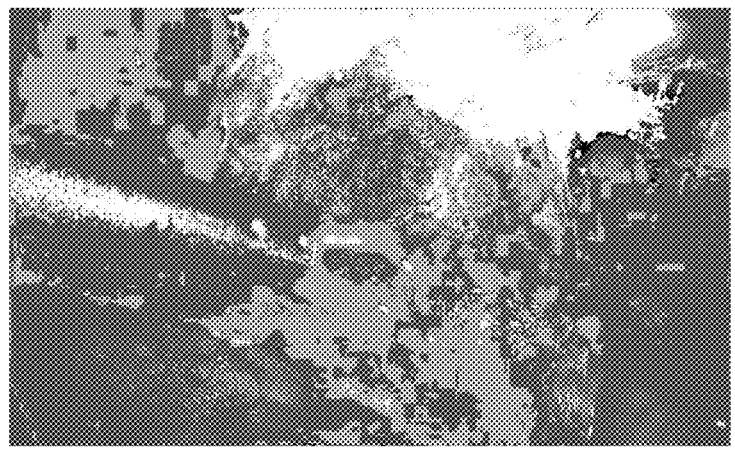
FIG. 4C shows an exemplary smoky video frame showing a local maximum saturation feature map of the exemplary smoky video frame, in accordance with some embodiments of the present disclosure.
Figure 4D:
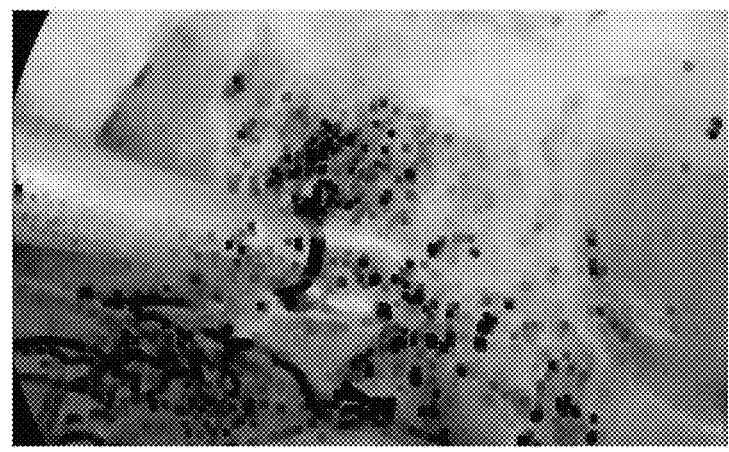
FIG. 4D shows an exemplary smoky video frame showing a contrast feature map of the exemplary smoky video frame, in accordance with some embodiments of the present disclosure.
Figure 4E:
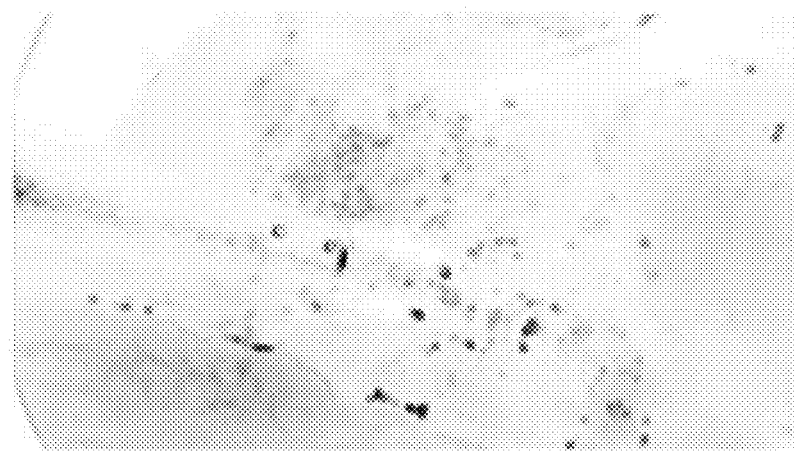
FIG. 4E shows an exemplary smoky video frame showing a high contrast map of the exemplary smoky video frame, in accordance with some embodiments of the present disclosure.
Figure 4F:
FIG. 4F shows an exemplary smoky video frame showing a binary map of the exemplary smoky video frame, in accordance with some embodiments of the present disclosure.
Figure 5A:
FIG. 5A shows an exemplary smoky video frame, in accordance with some embodiments of the present disclosure.
Figure 5B:
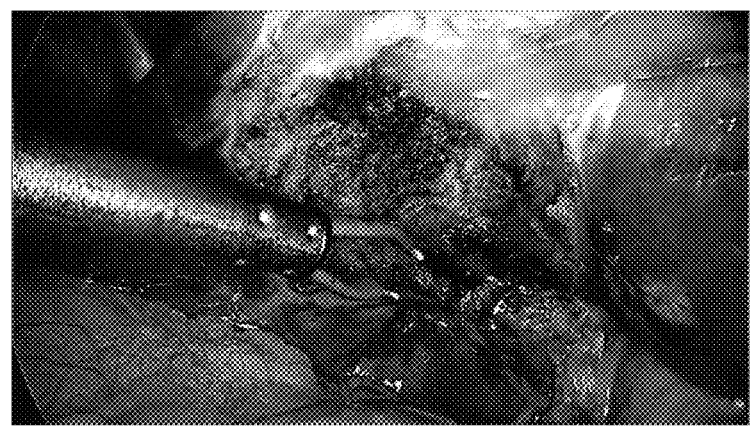
FIG. 5B shows an exemplary intermediate de-smoked video frame for the exemplary smoky video frame, in accordance with some embodiments of the present disclosure.
Figure 5C:
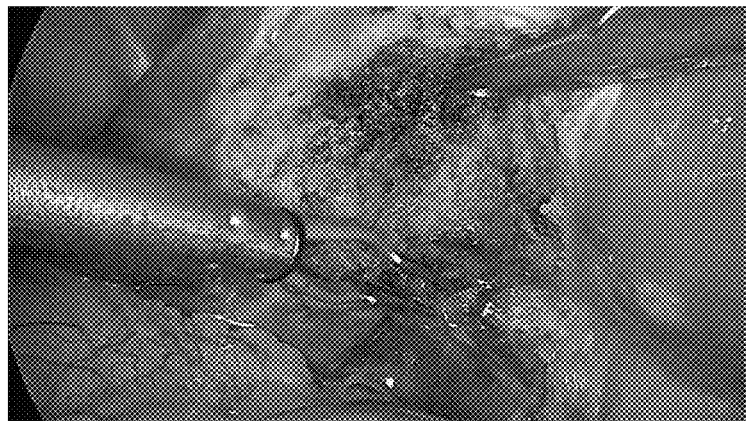
FIG. 5C shows an exemplary smoke-free reference video frame for the exemplary smoky video frame, in accordance with some embodiments of the present disclosure.
Figure 5D:
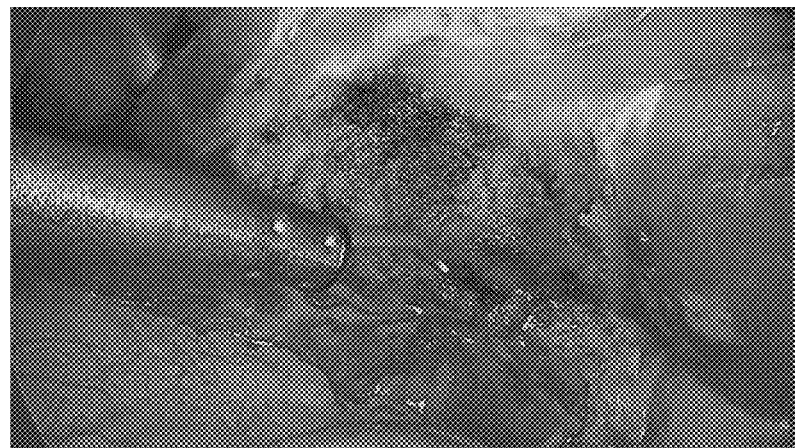
FIG. 5D shows an exemplary a de-smoked video frame for the exemplary smoky video frame using a polynomial histogram matching, in accordance with some embodiments of the present disclosure.

FIG. 4A through FIG. 4F shows an exemplary smoky video frame, a dark channel feature map of the exemplary smoky video frame, a hue disparity feature map of the exemplary smoky video frame, a local maximum saturation feature map of the exemplary smoky video frame, a contrast feature map of the exemplary smoky video frame, and a binary map of the exemplary smoky video frame, respectively, in accordance with some embodiments of the present disclosure. FIG. 4A shows the dark channel feature map of the exemplary smoky video frame, indicating higher intensities in the regions where the smoke is present while the smoke-free regions have zero intensities. FIG. 4B shows the hue disparity feature map of the exemplary smoky video frame, indicating higher values in the regions where the smoke is present. FIG. 4C shows the local maximum saturation feature map of the exemplary smoky video frame, indicating higher saturation values in the regions where the smoke is present. FIG. 4D shows the complement of contrast feature map of the exemplary smoky video frame, which is relatively higher in the regions where the smoke is present. The binary map of the exemplary smoky video frame shown in FIG. 4F clearly indicate the dense regions having the smoke.

At step 308 of the method 300, the one or more hardware processors 104 of the system 100 are configured to automatically estimate an air-light for each smoky video frame of the one or more smoky video frames, using the corresponding smoky feature map, through the air-light estimation unit 204 of FIG. 2. The air-light for each smoky video frame includes three air-light components in RGB color space. The dark channel feature map, the contrast feature map, the hue disparity feature map, and the local maximum saturation feature map determined at step 306 of the method 300, are normalized to have values in the range [0-1] before generating the smoky feature map an then a thresholding is applied on the generated smoky feature map to obtain a binary map (binary feature mask) of the corresponding smoky video frame. The binary map (binary feature mask) of the corresponding smoky video frame is used to identify the locations having dense smoke and these intensities are used to estimate the air-light, as these locations have least transmission. The air-light is estimated as an average of all smoky image intensities at the locations identified in the binary map of the corresponding smoky video frame. The air-light for each smoky video frame is automatically estimated without any further dependencies, using the binary map of the corresponding smoky video frame. The air-light ($A^c$) for each smoky video frame ($I^c(x)$) is mathematically expressed as in equation 7:

$$A^c = \frac{\sum_x Cb_{map}(x) \odot I^c(x)}{\sum_x Cb_{map}(x)} \quad (7)$$

wherein $Cb_{map}(x)$ represent the binary map obtained from the smoky feature map of the corresponding smoky video frame, and x represents the pixel location having the smoke.

At step 310 of the method 300, the one or more hardware processors 104 of the system 100 are configured to generate an intermediate de-smoked video frame for each smoky video frame of the one or more smoky video frames, based on the corresponding estimated air-light obtained at step 308 of the method 300. A de-smoking algorithm present in the de-smoking unit 206 of FIG. 2, is used to generate the intermediate de-smoked video frame for each smoky video frame. More specifically, the intermediate de-smoked video frame for each smoky video frame is generated by locally removing the one or more precise smoky regions (identified at step 304 of the method 300) present in the corresponding smoky video frame, based on the corresponding estimated air-light.

In an embodiment, the de-smoking algorithm may be an existing non-local de-smoking algorithm works under patch level. The non-local de-smoking algorithm relies on assumption that colors of smoke-free video frame may be grouped into a few hundred distinct tight clusters in RGB space. The colors in each of the clusters are often non-local, i.e. the colors are often spread across the video frame and also present at different distances. The presence of smoke transforms each of the colors in every cluster to spread across the few hundred distinct lines in RGB space and are termed as smoke lines.

The smoke lines are used to recover the smoke-free images. One end of each of these smoke lines have colors which are nearer to the video acquisition unit while the other end is the color corresponding to scene point farthest from the video acquisition unit or the air-light. Hence the non-local de-smoking algorithm removes only the one or more precise smoky regions, based on the estimated air-light and using the smoke lines, to generate the intermediate de-smoked video frame for each smoky video frame. Hence, the intermediate de-smoked video frame for each smoky video frame is a de-smoked (smoke-free) video frame, however, with induced color distortions introduced by the non-local de-smoking algorithm during the smoke removal. The induced color distortions may affect the overall quality and accuracy of the intermediate de-smoked video frame.

At step 312 of the method 300, the one or more hardware processors 104 of the system 100 are configured to identify a smoke-free reference video frame for each smoky video frame of the one or more smoky video frames, from the one or more smoke-free video frames obtained at step 304 of the method 300. The smoke-free reference video frame for each smoky video frame is a smoke-free video frame (out of the one or more smoke-free video frames), present just before the corresponding smoky video frame. The unique frame index may be used to identify the smoke-free reference video frame for each smoky video frame. In an embodiment, the smoke-free reference video frame for each smoky video frame may be different depending upon the presence of smoke in the subsequence video frames of the real-time video being received at step 302 of the method 300. Hence one or more smoke-free reference video frames may be present for the real-time video.

At step 314 of the method 300, the one or more hardware processors 104 of the system 100 are configured to generate a de-smoked video frame for each smoky video frame of the one or more smoky video frames, through the color reconstruction unit 208 of FIG. 2. The de-smoked video frame for each smoky video frame is generated by compensating color information obtained from the corresponding smoke-free reference video frame at step 312 of the method 300, locally in the one or more precise smoke regions (identified at step 304 of the method 300) of the corresponding intermediate de-smoked video frame. The color compensation is to compensate the color distortions induced by the non-local de-smoking algorithm during the smoke removal at step 310 of the method 300.

The de-smoked video frame for each smoky video frame is reconstructed by matching with a histogram of the corresponding smoke-free reference video frame with the histogram of the de-smoked video frame, for adjusting the color information. In an embodiment, histogram matching techniques such as uniform matching and a polynomial technique may be used for compensating the color information. The uniform matching uses histogram-based intensity function and histogram equalization. The polynomial method uses a cubic Hermite polynomial mapping function from the cumulative histograms of the corresponding smoke-free reference video frame and the de-smoked video frame.

FIG. 5A through FIG. 5D shows an exemplary smoky video frame, an intermediate de-smoked video frame for the exemplary smoky video frame, a smoke-free reference video frame for the exemplary smoky video frame, and a de-smoked video frame for the exemplary smoky video frame using a polynomial histogram matching, respectively, in accordance with some embodiments of the present disclosure. From FIG. 5A and FIG. 5D, the de-smoked video frame looks very close to the actual smoky video frame.

At step 314 of the method 300, the one or more hardware processors 104 of the system 100 are configured to stitch the de-smoked video frame for each smoky video frame of the one or more smoky video frames, to obtain a de-smoked video in the real-time for the video received in the real-time at step 302 of the method. The unique frame index may be used to stitch the corresponding de-smoked video frames associated with the plurality of video frames, in a sequential order. The obtained de-smoked video is the smoke-free version of the video received in the real-time at step 302 of the method.

Further, the one or more hardware processors 104 of the system 100 are configured to display the de-smoked video in the real-time, on the display unit such as the monitor. For the minimally invasive surgery applications, surgeons can simultaneously visualize the de-smoked video in the real-time on the display unit and may perform the surgery without any interruption. Further, as the de-smoked video does not contain any smoke disturbances, the field view, the surgeons may complete the surgery more effectively and efficiently, within the critical time.

The methods and systems for localized smoke removal and color restoration of the real-time video, automatically estimate the air-light based on the smoky feature map that contains the smoke relevant features including the dark channel features, the contrast features, the hue disparity features and the local maximum saturation features. Hence the estimated air-light is used to identify the locations having dense smoke, accurately and effectively in the video. The de-smoking algorithm removes only the smoke affected regions in the video based on the estimated air-light, and hence very minimal color distortions and other artifacts may be induced. Further, the smoke-free reference video frames are used to compensate the color distortions and other artifacts only for the smoke affected regions in the video, hence the present disclosure construct the de-smoked video as close as to the actual video without the smoke. Also, as only the smoke affected regions are processed, the present disclosure requires very minimal calculations and hence need less processing resources and less memory resources.

Though, the methods and systems of the present disclosure are described in light to the time critical minimally invasive surgeries such as laparoscopic surgeries, arthroscopic surgeries, and robotic surgeries, the scope of the present disclosure not limited and may be applied for similar applications including deep sea autonomous vehicle navigation, automated welding, firefighting devices, crane operation assistance at construction site, advanced driving assistance systems operating in scattering media, tracking and counting fish, coral reef monitoring, underwater 3-dimensional (3-D) reconstruction, and so on.

EXAMPLE SCENARIO

Cholec80 [A. P Twinanda, S. Shehata, D. Mutter, J. Marescaux, M De Mathelin, and Padoy. N, "Endonet: A deep architecture for recognition tasks on laparoscopic videos," IEEE Trans. Med. Imag, vol. 36, pp. 86-97, 2016.] data contains 80 videos with a resolution of 854×480 pixels of cholecystectomy surgeries. The smoky video frames and the smoke-free video frames are manually annotated from 40 videos to obtain a training dataset, a validation dataset set and a test dataset.

The convolutional neural network with encoder-decoder architecture is trained with 1200 smoky and smoky-free video frames present in the training dataset and the trained model (the smoke video frame identification model) has been tested on 415 frames of both smoky and smoke-free video frames present in the test dataset. Initially, the convolutional neural network with encoder-decoder architecture is trained only with only smoky video frames (positive samples), which resulted in significant false positives. Then, the smoke-free video frames (negative samples) are added for the training. A dice score of 0.84 for a learning rate of 0.0001 for 1000 epochs on the test set was obtained. The accuracy in detecting the presence of smoky frames is 85% with a high sensitivity of 98%.

Table 1 shows a PSNR of the present disclosure and the conventional techniques, (i) Berman (D. Berman, T. Treibitz, and S. Avidan, "Non-local image dehazing," in CVPR, 2016.), (ii) Gaofeng (M. Gaofeng, W. Ying, D. Jiangyon, X. Shiming, and P. Chunhong, "Efficient image dehazing with boundary constraint and contextual regularization," in ICCV, 2013.), (iii) Kaiming (H. Kaiming, S Jian, and T Xiaoou, "Guided image filtering," IEEE Trans. on Software Engg, vol. 35, no. 6, pp. 1397-1409, 2013.), (iv) He (H. Kaiming, S Jian, and T Xiaoou, "Single image haze removal using dark channel prior," IEEE trans on PAMI, vol. 33, no. 12, pp. 2341-2353, 2010.), using the smoke-free reference video frame. The Smoky video frame 1 and the Smoky video frame 2 are randomly taken from smoky video frames of the Cholec80.

From table 1, the present disclosure has a higher PSNR and average PSNR, indicating better color reconstruction and closeness to the smoke-free reference video frame as the subsequent smoky frame is very similar to the smoke-free reference video frame in color distribution. The average PSNR of 16.67 db of the present disclosure confirms the better color reconstruction than the conventional techniques.

TABLE 1

|  | Berman | Gaofeng | Kaiming | He | Present disclosure |
|---|---|---|---|---|---|
| Smoky video frame 1 | 15.57 | 15.73 | 15.49 | 17.06 | 17.63 |
| Smoky video frame 2 | 14.16 | 15.95 | 15.20 | 16.25 | 18.09 |
| Average | 14.51 | 15.38 | 14.50 | 15.62 | 16.67 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims (when included in the specification), the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for localized smoke removal and color restoration of a real-time video, the method comprising the steps of:
receiving, via one or more hardware processors, the real-time video, wherein the real-time video comprises a plurality of video frames;
identifying, via the one or more hardware processors, one or more smoky video frames and one or more smoke-free video frames, for the real-time video, from the plurality of video frames, wherein each smoky video frame of the one or more smoky video frames comprises one or more precise smoke regions;
generating, via the one or more hardware processors, a smoky feature map for each smoky video frame of the one or more smoky video frames, using smoke relevant features of the corresponding smoky video frame, wherein the smoky feature map for each smoky video frame comprises features of the one or more precise smoke regions;
automatically estimating, via the one or more hardware processors, an air-light for each smoky video frame of the one or more smoky video frames, using the corresponding smoky feature map, wherein the air-light ($A^c$) for each smoky video frame ($I^c(x)$) is estimated according to a relation:

$$A^c = \frac{\sum_x Cb_{map}(x) \odot I^c(x)}{\sum_x Cb_{map}(x)},$$

wherein $Cb_{map}(x)$ represent a binary map obtained from the smoky feature map of the corresponding smoky video frame, and x represents a pixel location having the smoke;
generating, via the one or more hardware processors, an intermediate de-smoked video frame for each smoky video frame of the one or more smoky video frames, based on the corresponding estimated air-light, using a de-smoking algorithm;

identifying, via the one or more hardware processors, a smoke-free reference video frame for each smoky video frame of the one or more smoky video frames, out of the one or more smoke-free video frames, wherein the smoke-free reference video frame for each smoky video frame is a smoke-free video frame out of the one or more smoke-free video frames, present just before the corresponding smoky video frame;

generating, via the one or more hardware processors, a de-smoked video frame for each smoky video frame of the one or more smoky video frames, by compensating color information obtained from the corresponding smoke-free reference video frame, locally in the one or more precise smoke regions of the corresponding intermediate de-smoked video frame; and stitching, via the one or more hardware processors, the de-smoked video frame for each smoky video frame of the one or more smoky video frames, to obtain a de-smoked video in real-time.

2. The method of claim 1, further comprising: displaying, via the one or more hardware processors, the de-smoked video in the real-time, on a display unit.

3. The method of claim 1, wherein the smoke relevant features comprises (i) dark channel features, (ii) contrast features, (iii) hue disparity features, and (iv) local maximum saturation features.

4. The method of claim 1, wherein generating the smoky feature map for each smoky video frame of the one or more smoky video frames, using the smoke relevant features for the corresponding smoky video frame, further comprising:

determining a dark channel feature map for each smoky video frame, based on minimum pixel color values of a local patch present in the corresponding smoky video frame, wherein the dark channel feature map for each smoky video frame comprises dark channel features;

determining a contrast feature map for each smoky video frame, based on a variance of pixel intensities obtained from the local patch, compared to a center pixel of the corresponding smoky video frame, wherein the contrast feature map for each smoky video frame comprises contrast features;

determining a hue disparity feature map for each smoky video frame, based on hue disparity between the corresponding smoky video frame and a corresponding semi-inverse smoky video frame, wherein the hue disparity feature map for each smoky video frame comprises hue disparity features;

determining a local maximum saturation feature map for each smoky video frame, based on maximum pixel-wise saturation values of the local patch present in the corresponding smoky video frame, wherein the local maximum saturation feature map for each smoky video frame comprises local maximum saturation features; and generating the smoky feature map for each smoky video frame, by combining the corresponding dark channel feature map, the corresponding contrast feature map, the corresponding hue disparity feature map, and the corresponding local maximum saturation feature map.

5. The method of claim 1, wherein the smoky feature map ($C_{map}$) for each smoky video frame is generated according to a relation:

$C_{map} = I_{dark}^p \odot (1 - I_{ct}^p) \odot (1 - I_{hd}) \odot (1 - I_{st})$, wherein p represents a patch size of a local patch within the corresponding smoky video frame, $\odot$ represents element-wise multiplication, $I_{dark}^p$ represents a dark channel feature map of the corresponding smoky video frame, $I_{ct}^p$ represents a contrast feature map of the corresponding smoky video frame, $I_{hd}$ represents a hue disparity feature map of the corresponding smoky video frame, and $I_{st}$ represents a local maximum saturation feature map of the corresponding smoky video frame.

6. The method of claim 1, wherein the intermediate de-smoked video frame for each smoky video frame is generated by locally removing the one or more precise smoke regions present in the corresponding smoky video frame, based on the corresponding estimated air-light, using the de-smoking algorithm.

7. A system for localized smoke removal and color restoration of a real-time video, the system comprising:

a memory storing instructions;

one or more Input/Output (I/O) interfaces; and one or more hardware processors coupled to the memory via the one or more I/O interfaces, wherein the one or more hardware processors are configured by the instructions to:

receive the real-time video, wherein the real-time video comprises a plurality of video frames;

identify one or more smoky video frames and one or more smoke-free video frames, for the real-time video, from the plurality of video frames, wherein each smoky video frame of the one or more smoky video frames comprises one or more precise smoke regions;

generate a smoky feature map for each smoky video frame of the one or more smoky video frames, using smoke relevant features of the corresponding smoky video frame, wherein the smoky feature map for each smoky video frame comprises features of the one or more precise smoke regions;

automatically estimate an air-light for each smoky video frame of the one or more smoky video frames, using the corresponding smoky feature map, wherein the air-light ($A^c$) for each smoky video frame ($I^c(x)$) is estimated according to a relation:

$$A^c = \frac{\sum_k Cb_{map}(x) \odot I^c(x)}{\sum_k Cb_{map}(x)},$$

wherein $Cb_{map}(x)$ represent a binary map obtained from the smoky feature map of the corresponding smoky video frame, and x represents a pixel location having the smoke;

generate an intermediate de-smoked video frame for each smoky video frame of the one or more smoky video frames, based on the corresponding estimated air-light, using a de-smoking algorithm;

identify a smoke-free reference video frame for each smoky video frame of the one or more smoky video frames, out of the one or more smoke-free video frames, wherein the smoke-free reference video frame for each smoky video frame is a smoke-free video frame out of the one or more smoke-free video frames, present just before the corresponding smoky video frame;

generate a de-smoked video frame for each smoky video frame of the one or more smoky video frames, by compensating color information obtained from the corresponding smoke-free reference video frame, locally in the one or more precise smoke regions of the corresponding intermediate de-smoked video frame; and stitch the de-smoked video frame for each smoky video frame of the one or more smoky video frames, to obtain a de-smoked video in the real-time.

8. The system of claim 7, wherein the one or more hardware processors are further configured to display the de-smoked video in the real-time, on a display unit.

9. The system of claim 7, wherein the smoke relevant features comprises (i) dark channel features, (ii) contrast features, (iii) hue disparity features, and (iv) local maximum saturation features.

10. The system of claim 7, wherein the one or more hardware processors are further configured to generate the smoky feature map for each smoky video frame of the one or more smoky video frames, using the smoke relevant features for the corresponding smoky video frame, by:

determining a dark channel feature map for each smoky video frame, based on minimum pixel color values of a local patch present in the corresponding smoky video frame, wherein the dark channel feature map for each smoky video frame comprises dark channel features;

determining a contrast feature map for each smoky video frame, based on a variance of pixel intensities obtained from the local patch, compared to a center pixel of the corresponding smoky video frame, wherein the contrast feature map for each smoky video frame comprises contrast features;

determining a hue disparity feature map for each smoky video frame, based on hue disparity between the corresponding smoky video frame and a corresponding semi-inverse smoky video frame, wherein the hue disparity feature map for each smoky video frame comprises hue disparity features;

determining a local maximum saturation feature map for each smoky video frame, based on maximum pixel-wise saturation values of the local patch present in the corresponding smoky video frame, wherein the local maximum saturation feature map for each smoky video frame comprises local maximum saturation features; and generating the smoky feature map for each smoky video frame, by combining the corresponding dark channel feature map, the corresponding contrast feature map, the corresponding hue disparity feature map, and the corresponding local maximum saturation feature map.

11. The system of claim 7, wherein the one or more hardware processors are further configured to generate the smoky feature map ($C_{map}$) for each smoky video frame, according to a relation:

$C_{map}=I_{dark}^{p}\odot(1-I_{ct}^{p})\odot(1-I_{hd})\odot(1-I_{st})$, wherein p represents a patch size of a local patch within the corresponding smoky video frame, $\odot$ represents element-wise multiplication, $I_{dark}^{p}$ represents a dark channel feature map of the corresponding smoky video frame, $I_{ct}^{p}$ represents a contrast feature map of the corresponding smoky video frame, $I_{hd}$ represents a hue disparity feature map of the corresponding smoky video frame, and $I_{st}$ represents a local maximum saturation feature map of the corresponding smoky video frame.

12. The system of claim 7, wherein the one or more hardware processors are further configured to generate the intermediate de-smoked video frame for each smoky video frame, by locally removing the one or more precise smoke regions present in the corresponding smoky video frame, based on the corresponding estimated air-light, using the de-smoking algorithm.

13. A computer program product comprising a non-transitory computer readable medium having a computer readable program embodied therein, wherein the computer readable program, when executed on a computing device, causes the computing device to:

receive the real-time video, wherein the real-time video comprises a plurality of video frames;

identify one or more smoky video frames and one or more smoke-free video frames, for the real-time video, from the plurality of video frames, wherein each smoky video frame of the one or more smoky video frames comprises one or more precise smoke regions;

generate a smoky feature map for each smoky video frame of the one or more smoky video frames, using smoke relevant features of the corresponding smoky video frame, wherein the smoky feature map for each smoky video frame comprises features of the one or more precise smoke regions;

automatically estimate an air-light for each smoky video frame of the one or more smoky video frames, using the corresponding smoky feature map, wherein the air-light ($A^c$) for each smoky video frame ($I^c(x)$) is estimated according to a relation:

$$A^c = \frac{\sum_x Cb_{map}(x) \odot I^c(x)}{\sum_x Cb_{map}(x)},$$

wherein $Cb_{map}(x)$ represent a binary map obtained from the smoky feature map of the corresponding smoky video frame, and x represents a pixel location having the smoke;

generate an intermediate de-smoked video frame for each smoky video frame of the one or more smoky video frames, based on the corresponding estimated air-light, using a de-smoking algorithm;

identify a smoke-free reference video frame for each smoky video frame of the one or more smoky video frames, out of the one or more smoke-free video frames, wherein the smoke-free reference video frame for each smoky video frame is a smoke-free video frame out of the one or more smoke-free video frames, present just before the corresponding smoky video frame;

generate a de-smoked video frame for each smoky video frame of the one or more smoky video frames, by compensating color information obtained from the corresponding smoke-free reference video frame, locally in the one or more precise smoke regions of the corresponding intermediate de-smoked video frame; and stitch the de-smoked video frame for each smoky video frame of the one or more smoky video frames, to obtain a de-smoked video in real-time.

* * * * *